(12) United States Patent
Feulner et al.

(10) Patent No.: US 11,459,946 B2
(45) Date of Patent: Oct. 4, 2022

(54) GAS TURBINE ENGINE SPOOL COUPLING

(71) Applicant: United Technologies Corporation, Farmington, CT (US)

(72) Inventors: Matthew R. Feulner, West Hartford, CT (US); Gary Collopy, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 451 days.

(21) Appl. No.: 16/536,526

(22) Filed: Aug. 9, 2019

(65) Prior Publication Data

US 2021/0040896 A1    Feb. 11, 2021

(51) Int. Cl.
| | | |
|---|---|---|
| *F02C 3/113* | (2006.01) | |
| *F01D 25/34* | (2006.01) | |
| *F02C 9/00* | (2006.01) | |
| *F02C 7/36* | (2006.01) | |
| *F02C 7/275* | (2006.01) | |

(52) U.S. Cl.
CPC .............. *F02C 3/113* (2013.01); *F01D 25/34* (2013.01); *F02C 7/275* (2013.01); *F02C 7/36* (2013.01); *F02C 9/00* (2013.01); *F05D 2220/323* (2013.01); *F05D 2260/4031* (2013.01); *F05D 2270/304* (2013.01)

(58) Field of Classification Search
CPC .............. F02C 3/107; F02C 3/113; F02C 7/36
See application file for complete search history.

(56) References Cited

U.S. PATENT DOCUMENTS

| | | | | |
|---|---|---|---|---|
| 4,062,186 A | | 12/1977 | Snow et al. | |
| 5,349,814 A | * | 9/1994 | Ciokajlo | F02C 7/262 |
| | | | | 60/226.1 |
| 5,694,765 A | * | 12/1997 | Hield | F02C 7/32 |
| | | | | 60/39.163 |
| 8,881,534 B2 | | 11/2014 | Copeland et al. | |
| 9,051,881 B2 | * | 6/2015 | Bettner | F02C 7/275 |
| 10,072,581 B2 | * | 9/2018 | Waissi | F02C 7/275 |

(Continued)

FOREIGN PATENT DOCUMENTS

EP    2540991 A2    1/2013

OTHER PUBLICATIONS

Letter filed Aug. 10, 2021 for the corresponding EPO Application No. 20190313.5 (3772579) (Year: 2021).*

(Continued)

*Primary Examiner* — Topaz L. Elliott
(74) *Attorney, Agent, or Firm* — Cantor Colburn LLP (57) ABSTRACT

A system includes a gas turbine engine having a low speed spool and a high speed spool. The system also includes a spool coupling system configured to mechanically link the low speed spool and the high speed spool. A controller is operable to determine a mode of operation of the gas turbine engine, monitor for a spool coupling activation condition associated with the mode of operation, and activate the spool coupling system based on the controller detecting the spool coupling activation condition. Engagement and power transfer between the low speed spool and the high speed spool occurs based on activation of the spool coupling system and reaching an engagement condition of the spool coupling system.

18 Claims, 6 Drawing Sheets

(56) References Cited

U.S. PATENT DOCUMENTS

| | | | |
|---|---|---|---|
| 10,352,247 B2* | 7/2019 | Sheridan | F02C 3/107 |
| 10,644,630 B2* | 5/2020 | Smith | H02P 9/04 |
| 2009/0261989 A1* | 10/2009 | Eick | F02C 7/262 |
| | | | 340/963 |
| 2012/0133150 A1* | 5/2012 | Dooley | B64D 41/00 |
| | | | 290/1 A |
| 2013/0000317 A1* | 1/2013 | Berryann | F02C 3/113 |
| | | | 60/778 |
| 2015/0377142 A1 | 12/2015 | Sheridan et al. | |
| 2016/0053691 A1* | 2/2016 | Ernst | F02C 9/28 |
| | | | 415/121.3 |
| 2017/0074169 A1* | 3/2017 | Waissi | F02C 7/275 |
| 2019/0218977 A1 | 7/2019 | Muldoon | |
| 2020/0355122 A1* | 11/2020 | Foutch | B64D 35/02 |
| 2021/0047970 A1* | 2/2021 | Collopy | B64D 27/02 |
| 2021/0108569 A1* | 4/2021 | Devendorf | F02C 7/264 |

OTHER PUBLICATIONS

EP Application No. 20190313.5 Extended EP Search Report dated Jan. 12, 2021, 6 pages.

* cited by examiner

GAS TURBINE ENGINE SPOOL COUPLING

BACKGROUND

The subject matter disclosed herein generally relates to rotating machinery and, more particularly, to a method and an apparatus for gas turbine engine spool coupling.

Gas turbine engines of an aircraft can have different starting requirements for ground-based starting and in-flight restarting. Ground-based starting is performed at a steady altitude, while in-flight restarting can occur during a change in altitude and speed of the aircraft. In-flight starting can use a windmill effect to drive engine spool rotation by decreasing aircraft altitude. A windmill envelope defines a range of altitudes and airspeeds where windmill restarting can be effectively performed that minimizes that chances of rotor lock, dual flameout, or other issues.

BRIEF DESCRIPTION

According to one embodiment, a system includes a gas turbine engine having a low speed spool and a high speed spool. The system also includes a spool coupling system configured to mechanically link the low speed spool and the high speed spool. A controller is operable to determine a mode of operation of the gas turbine engine, monitor for a spool coupling activation condition associated with the mode of operation, and activate the spool coupling system based on the controller detecting the spool coupling activation condition. Engagement and power transfer between the low speed spool and the high speed spool occurs based on activation of the spool coupling system and reaching an engagement condition of the spool coupling system.

In addition to one or more of the features described above or below, or as an alternative, further embodiments may include where disengagement of the spool coupling system occurs based on the gas turbine engine reaching a disengagement condition.

In addition to one or more of the features described above or below, or as an alternative, further embodiments may include where the controller is operable to deactivate the spool coupling system to prevent reengagement of the spool coupling system above the spool coupling activation condition.

In addition to one or more of the features described above or below, or as an alternative, further embodiments may include where the mode of operation of the gas turbine engine distinguishing between ground-based operation and flight operation.

In addition to one or more of the features described above or below, or as an alternative, further embodiments may include where the spool coupling activation condition includes detecting a reduction in speed of the low speed spool below an idle condition prior to a windmill condition while the mode of operation is an in-flight mode.

In addition to one or more of the features described above or below, or as an alternative, further embodiments may include where the engagement condition of the spool coupling system includes a gear ratio level of the spool coupling system aligning with a ratio of high speed spool speed to low speed spool speed.

In addition to one or more of the features described above or below, or as an alternative, further embodiments may include where a stabilization condition is reached after engagement of the spool coupling system resulting in fan windmill power being transferred to the high speed spool.

In addition to one or more of the features described above or below, or as an alternative, further embodiments may include where the low speed spool provides power to the high speed spool until the spool coupling system reaches a disengagement condition, and the spool coupling system is deactivated to prevent reengagement of the spool coupling system above the spool coupling activation condition.

In addition to one or more of the features described above or below, or as an alternative, further embodiments may include where the mode of operation of the gas turbine engine is a sub-idle mode that activates, engages, disengages, and deactivates the spool coupling system below an idle level of operation of the gas turbine engine during flight.

In addition to one or more of the features described above or below, or as an alternative, further embodiments may include where the mode of operation of the gas turbine engine is a low spool power-assisted idle that results in the high speed spool at idle when the spool coupling system is engaged.

In addition to one or more of the features described above or below, or as an alternative, further embodiments may include where the spool coupling system includes a variable transmission system with multiple gear ratios and multiple levels of spool power transfer and engagement speeds.

According to an embodiment, a method includes determining, by a controller, a mode of operation of a gas turbine engine, the gas turbine engine having a low speed spool and a high speed spool. The controller monitors for a spool coupling activation condition associated with the mode of operation. A spool coupling system is activated based on the controller detecting the spool coupling activation condition. The engagement and power transfer between the low speed spool and the high speed spool occurs based on activation of the spool coupling system and reaching an engagement condition of the spool coupling system. The spool coupling system is configured to mechanically link the low speed spool and the high speed spool.

In addition to one or more of the features described above or below, or as an alternative, further embodiments may include deactivating the spool coupling system to prevent reengagement of the spool coupling system above the spool coupling activation condition.

A technical effect of the apparatus, systems and methods is achieved by performing gas turbine engine spool coupling.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
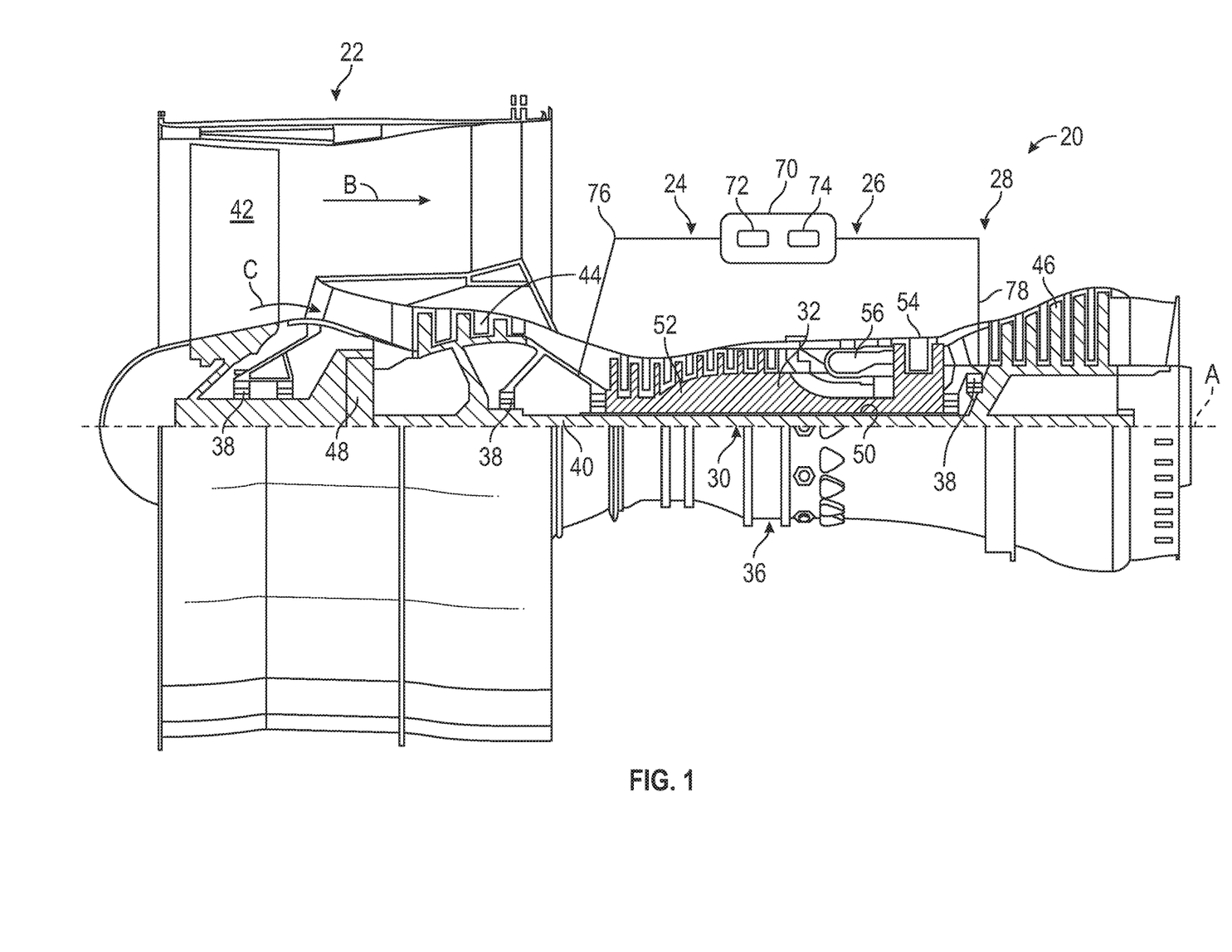
FIG. 1 is a partial cross-sectional illustration of a gas turbine engine with spool coupling, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than about ten (10). Some embodiments can include a gear system 48 with an epicyclic gear train, such as a planetary gear system or other gear system, for example, with a gear reduction ratio of greater than about 2.3. The low pressure turbine 46 can have a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

The gas turbine engine 20 includes a spool coupling system 70 that is configured to mechanically link the low speed spool 30 and the high speed spool 32. The spool coupling system 70 can include a gear train 72 and clutch 74 that enable selective engagement and power transfer between the low speed spool 30 and the high speed spool 32. The gear train 72 can include a series of gears at a gear ratio, for instance, that is activated below an idle speed of the gas turbine engine 20 that establishes a matching condition between the low speed spool 30 and the high speed spool 32. In some embodiments, the spool coupling system 70 can be a variable speed transmission that supports a wider range of speeds. The clutch 74 can be a unidirectional clutch, such as a sprag. A first shaft 76 can link the spool coupling system 70 with the inner shaft 40, and a second shaft 78 can link the spool coupling system 70 with the outer shaft 50. Although depicted schematically in FIG. 1, it will be understood that linkages and coupling can include intermediate features such as gearboxes that enable power transfer between the inner shaft 40, first shaft 76, gear train 72, clutch 74, second shaft 78, and the outer shaft 50. Further, the alignment of the spool coupling system 70 relative to components of the gas turbine engine 20 is depicted schematically for purposes of explanation and is not limiting with respect to sizing, placement, and other such aspects.

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
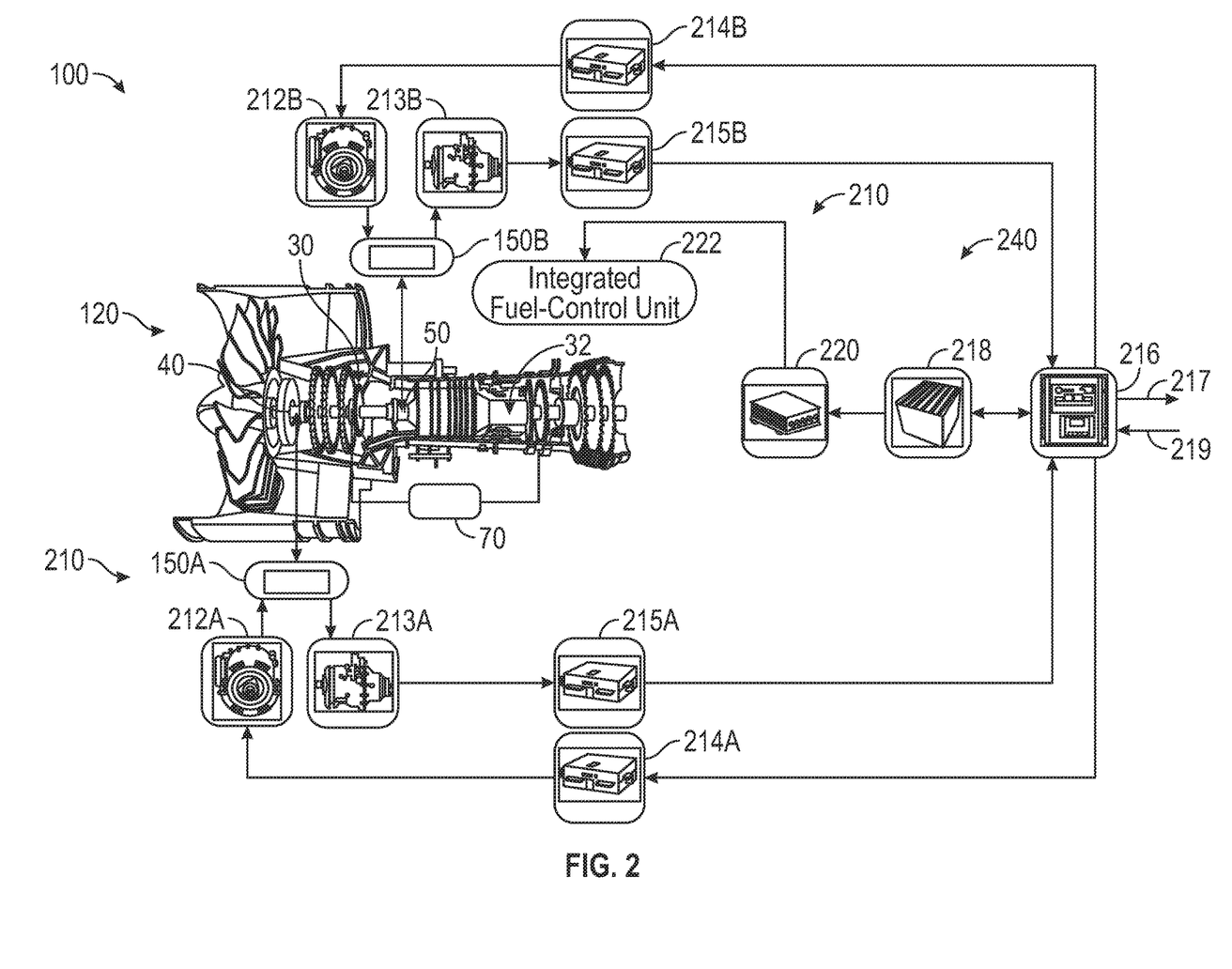
FIG. 2 is a schematic diagram of a hybrid electric propulsion system with spool coupling, in accordance with an embodiment of the disclosure.

FIG. 2 illustrates a hybrid electric propulsion system 100 (also referred to as hybrid gas turbine engine 100 or hybrid propulsion system 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212B) or additional electric motors (not depicted). Further, the electric motors 212A, 212B are generally referred to as motors 212A, 212B, as alternate power sources may be used, such as hydraulic motors, pneumatic motors, and other such types of motors known in the art. The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B (generally referred to as generators 213A, 213B) are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s). In some embodiments, the mechanical power transmission 150A, first electric motor 212A, first electric generator 213A, and associated electronics can be omitted.

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. The energy storage management system 216 may also transfer power to one or more electric motors on the engine, or to external loads 217 and receive power from one or more external power sources 219 (e.g., aircraft power, auxiliary power unit power, cross-engine power, and the like).

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can also power a plurality of actuators (not depicted), such as bleed actuators, vane actuators, and the like.

The spool coupling system 70, as previously described with respect to FIG. 1, can be used to mechanically transfer power between the low speed spool 30 and the high speed spool 32 of the gas turbine engine 120. The spool coupling system 70 can be activated and deactivated to operate under selected conditions, such as in support of windmill starting to directly transfer power between the low speed spool 30 and the high speed spool 32. Further, the spool coupling system 70 can be activated for transferring power of an electric motor to both spools, such as using the first electric motor 212A for taxiing operations through the low speed spool 30 while also driving the high speed spool 32 to operate accessories and prepare for ground-based starting. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, spool coupling system 70, and/or other elements (not depicted).

Figure 3:
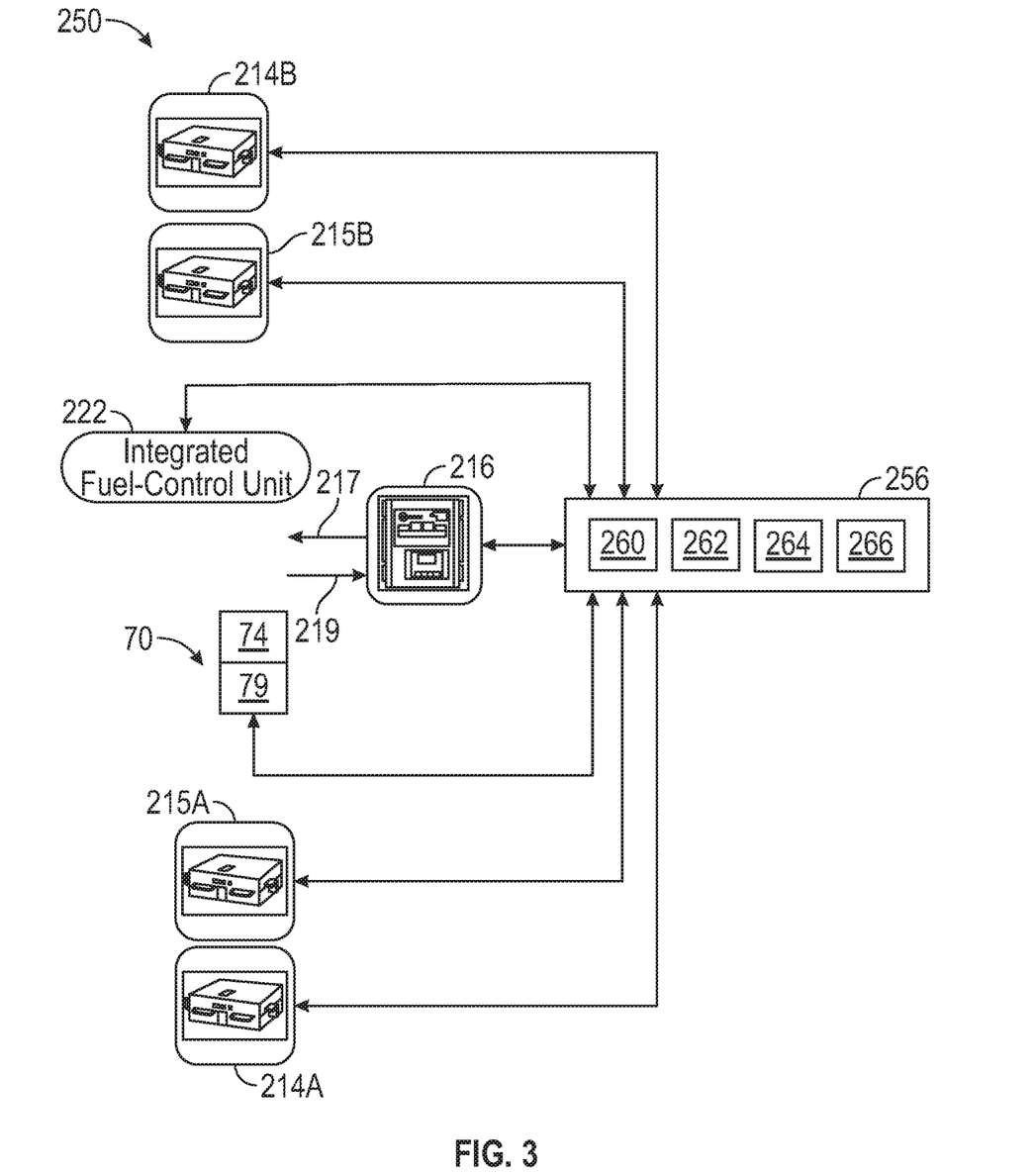
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, spool coupling system 70, and/or other components (not depicted) of the hybrid electric propulsion system 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a spool coupling control 266 that controls the activation/deactivation of the spool coupling system 70 and/or other hybrid electric system control effectors 240 further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, spool coupling system 70, and/or other components (not depicted) of the hybrid electric propulsion system 100. The controller 256 provides a means for controlling the hybrid electric system control effectors 240 using a spool coupling control 266 that can be dynamically updated during operation of the hybrid electric propulsion system 100. The means for controlling the hybrid electric system control effectors 240 can be otherwise subdivided, distributed, or combined with other control elements.

The controller 256 with spool coupling control 266 can apply control laws and access/update models to determine how to control and transfer power between the low speed spool 30 and high speed spool 32. For example, sensed and/or derived parameters related to speed, flow rate, pressure ratios, temperature, thrust, and the like can be used to establish operational schedules and transition limits to maintain efficient operation of the gas turbine engine 120. For instance, a mode of operation of the gas turbine engine 120, such as idle, takeoff, climb, cruise, and descent can have different power settings, thrust requirements, flow requirements, and temperature effects. The spool coupling control 266 can control an electro-mechanical actuator 79 of the spool coupling system 70 that enables engagement/disengagement of clutch 74 when the electro-mechanical actuator 79 is activated. The spool coupling control 266 can determine when the spool coupling system 70 should be activated to prevent engagement and mechanical linking of the low speed spool 30 and the high speed spool 32 under other conditions where such linkage may be less desirable.

Figure 4:
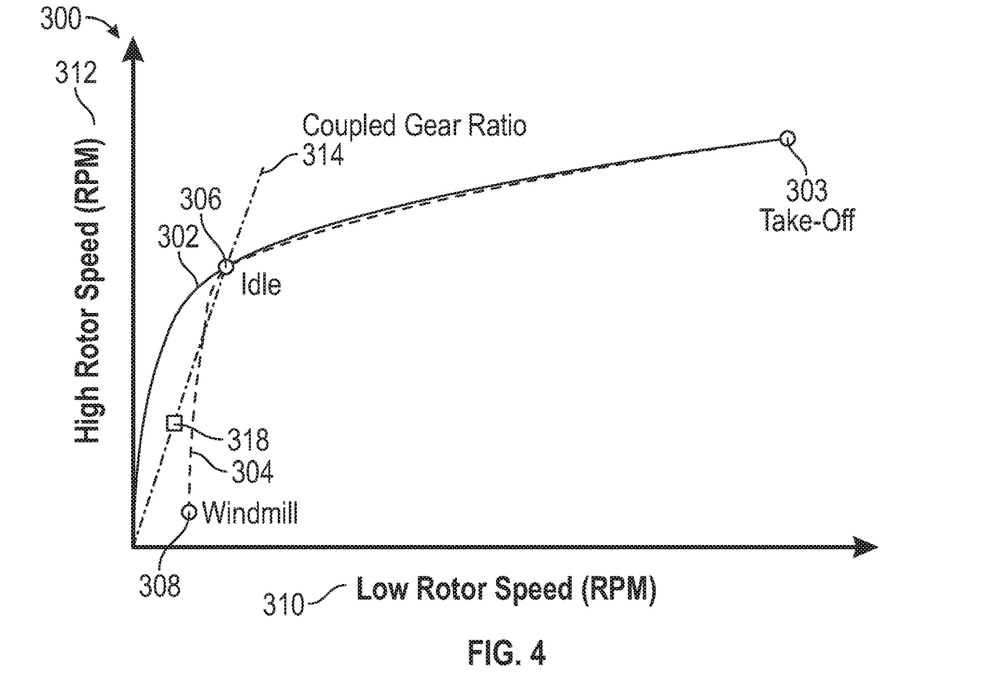
FIG. 4 is a plot that graphically illustrates a relationship between speeds of a low speed spool and a high speed spool to support cross-spool coupling, in accordance with an embodiment of the disclosure.

Referring now to FIG. 4, plot 300 graphically illustrates a relationship between speeds of low speed spool 30 and a high speed spool 32 to support cross-spool coupling in a gas turbine engine, such as the gas turbine engine 20, 120 of FIGS. 1 and 2. In this example, ground operation 302 (through take-off 303) and in-flight operation 304 plots depict relationships between a speed 310 of the low speed spool 30 and a speed 312 of the high speed spool 32. As can be seen in the example of FIG. 4, changes in the speed 310 of the low speed spool 30 and the speed 312 of the high speed spool 32 are typically non-linear over a range of operating speeds where the low speed spool 30 and the high speed spool 32 are not mechanically coupled together. Above idle 306, the ground operation 302 and in-flight operation 304 substantially overlap. The in-flight operation 304 can deviate from the ground operation 302 below idle 306 in approaching a windmill condition 308. A coupled gear ratio 314 can define a linear relationship between the speed 310 of the low speed spool 30 and the speed 312 of the high speed spool 32 as implemented in the gear train 72 of FIG. 1. When the spool coupling system 70 is activated and engaged at or below idle 306, the in-flight operation 304 deviates from windmill condition 308 toward a geared windmill condition 318. The geared windmill condition 318 has a higher value of speed 312 of the high speed spool 32 at a lower value of speed 310 of the low speed spool 30. This can increase margin against the high speed spool 32 becoming locked at windmill conditions following an engine shutdown. Further, the spool coupling system 70 can improve in-flight start capability in windmill conditions and enable more reliable quick-relights. The spool coupling system 70 may also improve starter assisted start capability in windmill conditions when used in combination with one or more of the electric motors 212A, 212B, for example.

Figure 5:
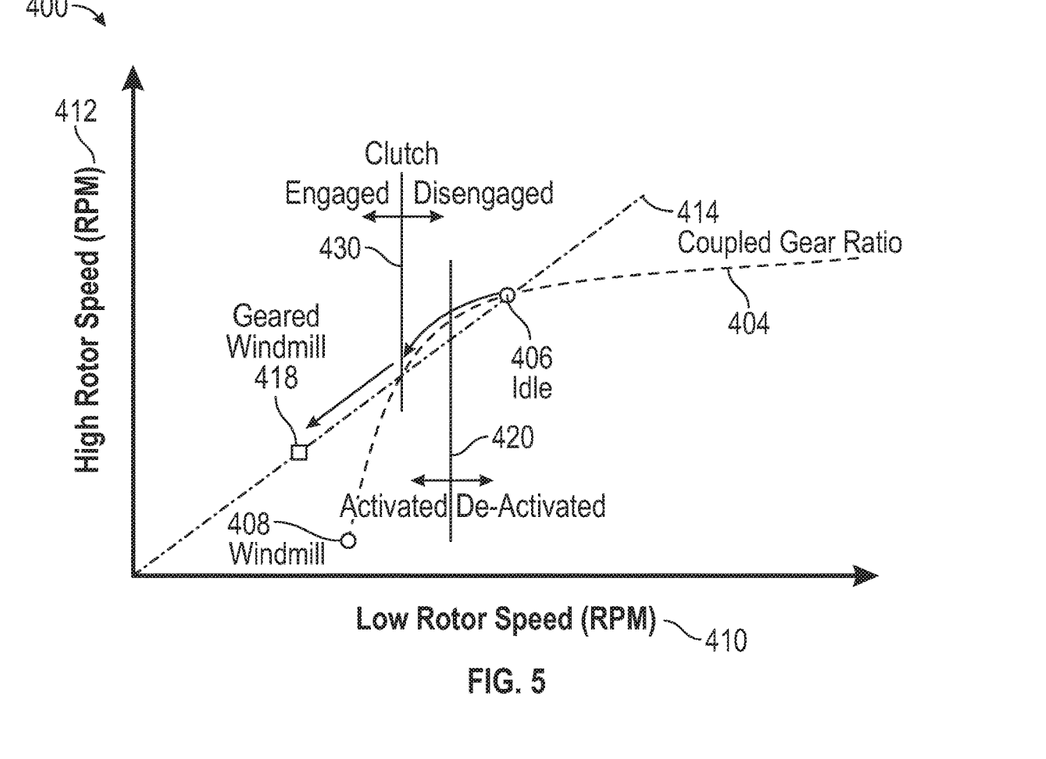
FIG. 5 is a plot that graphically illustrates a relationship between a low speed spool and a high speed spool to support cross-spool coupling, in accordance with an embodiment of the disclosure.

Referring now to FIG. 5, plot 400 graphically illustrates a relationship between speeds of low speed spool 30 and a high speed spool 32 to support cross-spool coupling in a gas turbine engine, such as the gas turbine engine 20, 120 of FIGS. 1 and 2. Plot 400 is an example of an in-flight shutdown and restart scenario. In-flight operation 404 depicts a relationship between a speed 410 of the low speed spool 30 and a speed 412 of the high speed spool 32. Below idle 406, the in-flight operation 404 is non-linear approaching a windmill condition 408. A coupled gear ratio 414 can define a linear relationship between the speed 410 of the low speed spool 30 and the speed 412 of the high speed spool 32 as implemented in the gear train 72 of FIG. 1. A spool coupling activation condition 420 can define a threshold for activating or deactivating the spool coupling system 70, where the spool coupling system 70 engages at an engagement condition 430. The spool coupling activation condition 420 can be defined below idle 406 and above the engagement condition 430. The engagement condition 430 can be an alignment point where the in-flight operation 404 intersects the coupled gear ratio 414 before reaching the windmill condition 408. When the spool coupling system 70 is activated and engaged at or below idle 406, the in-flight operation 404 deviates from windmill condition 408 toward a geared windmill condition 418. The geared windmill condition 418 has a higher value of speed 412 of the high speed spool 32 at a lower value of speed 410 of the low speed spool 30.

As the gas turbine engine 20, 120 is shut down from idle or above, the clutch 74 is activated (although not yet engaged) as the low speed spool 30 (or high speed spool 32) transitions below idle 406 while the speed 412 of the high speed spool 32 is still above the level of the coupled gear ratio 414. As the speeds 410, 412 continue to decrease, the high speed spool 32 will naturally approach the level of the coupled gear ratio 414 and engage the clutch 74 at which point the low speed spool 30 is transferring power to the high speed spool 32 to maintain the fixed coupled gear ratio of the gear train 72. As the speeds 410, 412 continue to decrease the spools 30, 32 will maintain the coupled gear ratio 414 until a stabilized condition is reached with some fan windmill power being transferred to the high speed spool 32, resulting in a lower windmill speed of the low speed spool 30 but a higher high speed of the high speed spool 32. During an in-flight start, the low speed spool 30 will continue to supply power to the high speed spool 32 up until the point of clutch 74 disengagement as the speed 412 of the high speed spool 32 naturally increases beyond the level of the coupled gear ratio 414, then the spool coupling system 70 de-activates to ensure the clutch 74 does not re-engage above idle 406.

Figure 6:
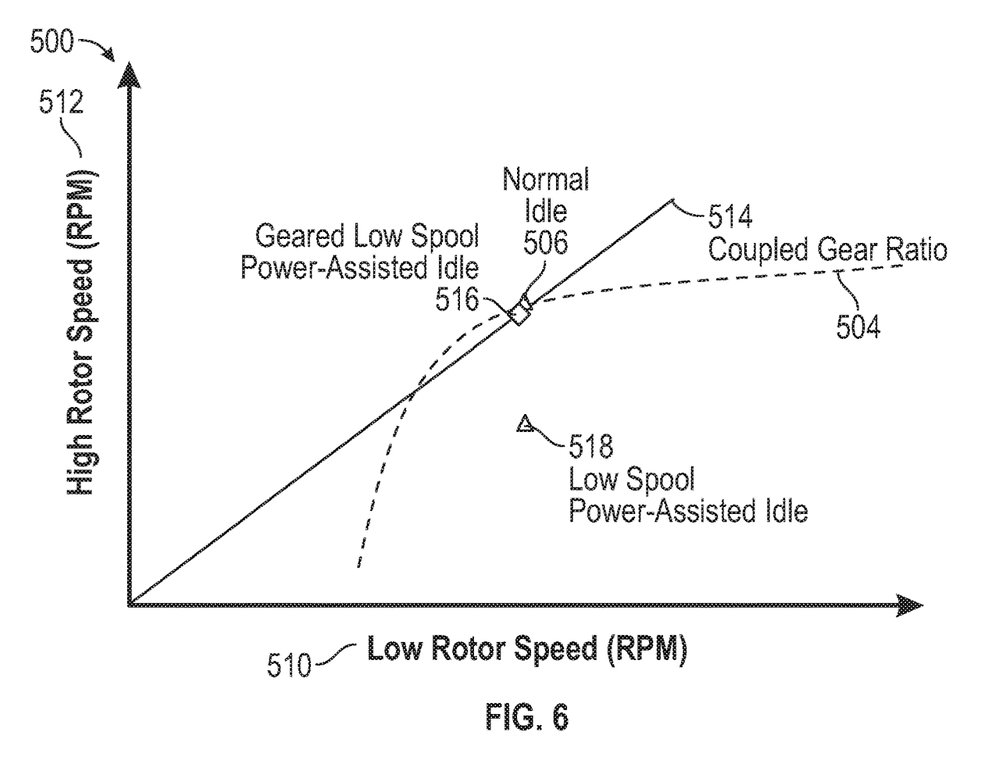
FIG. 6 is a plot that graphically illustrates a relationship between a low speed spool and a high speed spool to support cross-spool coupling, in accordance with an embodiment of the disclosure.

Referring now to FIG. 6, plot 500 graphically illustrates a relationship between speeds of low speed spool 30 and a high speed spool 32 to support cross-spool coupling in a gas turbine engine, such as the gas turbine engine 20, 120 of FIGS. 1 and 2. Plot 500 is an example of low-spool power assisted idle. In-flight operation 504 depicts a relationship between a speed 510 of the low speed spool 30 and a speed 512 of the high speed spool 32. Below idle 506, the in-flight operation 504 is non-linear. A coupled gear ratio 514 can define a linear relationship between the speed 510 of the low speed spool 30 and the speed 512 of the high speed spool 32 as implemented in the gear train 72 of FIG. 1. Under normal conditions, power-assist to the low speed spool 30 at idle 506 will result in lower fuel flow (or none if the gas turbine engine 120 is completely externally powered) and a lower (sub-idle) speed 512 of the high speed spool 32. Utilizing the spool coupling system 70, the high speed spool 32 can be forced up to the normal speed of idle 506 as geared low spool power-assisted idle 516 even though there is less or no fuel flow. When the power assist (e.g., electric motor 212A) is removed or a restart is desired, the engine spools 30, 32 are already at the idle condition, resulting in no delay in achieving idle 506, compared with a restart time if no spool coupling was utilized at low spool power-assisted idle 518.

Figure 7:
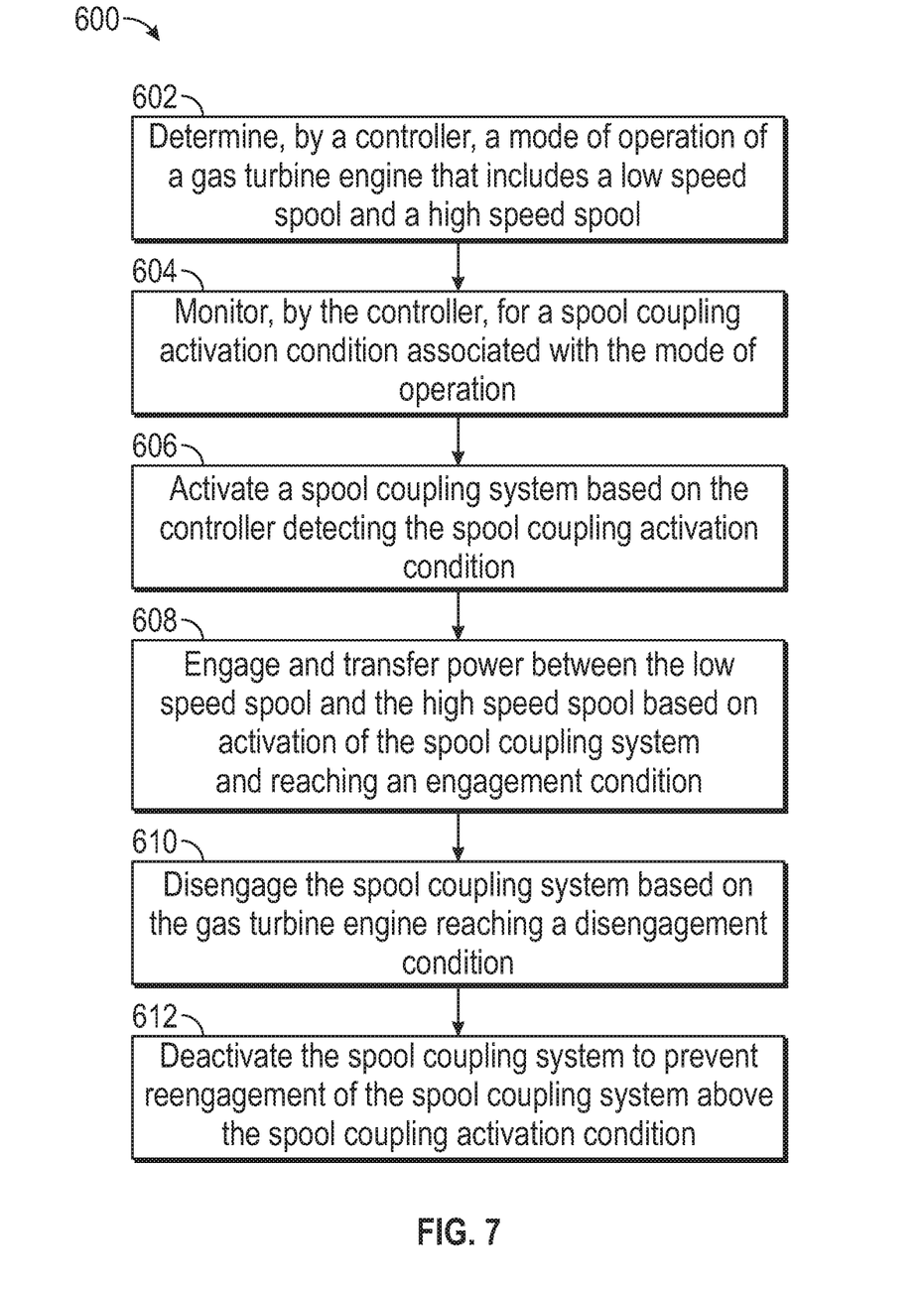
FIG. 7 is a flow chart illustrating a method, in accordance with an embodiment of the disclosure.

Referring now to FIG. 7 with continued reference to FIGS. 1-6, FIG. 7 is a flow chart illustrating a method 600 for providing selective spool coupling, in accordance with an embodiment. The method 600 may be performed, for example, by the gas turbine engine 20 of FIG. 1, the hybrid electric propulsion system 100 of FIG. 2, or other such configurations that include the spool coupling system 70. For purposes of explanation, the method 600 is described primarily with respect to the hybrid electric propulsion system 100 of FIG. 2; however, it will be understood that the method 600 can be performed on other configurations (not depicted).

Method 600 pertains to the controller 256 executing embedded code for the spool coupling control 266 along with other control functions. At block 602, the controller 256 can determine a mode of operation of a gas turbine engine 120 that includes a low speed spool 30 and a high speed spool 32. The mode of operation can be determined based on a thrust command, operating parameters, sensed values, and/or other factors known in the art. The mode of operation of the gas turbine engine 120 can distinguish between ground-based operation and flight operation.

At block 604, the controller 256 can monitor for a spool coupling activation condition associated with the mode of operation. The spool coupling activation condition can include detecting a reduction in speed of the low speed spool 30 below an idle condition prior to a windmill condition while the mode of operation is an in-flight mode.

At block 606, the controller 256 can activate a spool coupling system 70 based on the controller 256 detecting the spool coupling activation condition. At block 608, engagement and power transfer between the low speed spool 30 and the high speed spool 32 can occur based on activation of the spool coupling system 70 and reaching an engagement condition of the spool coupling system 70. The spool coupling system 70 is configured to mechanically link the low speed spool 30 and the high speed spool 32. The engagement condition of the spool coupling system 70 can include a gear ratio level of the spool coupling system 70 aligning with a ratio of high speed spool 32 speed to low speed spool 30 speed. A stabilization condition can be reached after engagement of the spool coupling system 70, resulting in fan windmill power being transferred to the high speed spool 32.

At block 610, disengagement of the spool coupling system 70 occurs based on the gas turbine engine 20 reaching a disengagement condition. At block 612, the controller 256 can deactivate the spool coupling system 70 to prevent reengagement of the spool coupling system 70 above the spool coupling activation condition. The low speed spool 30 can provide power to the high speed spool 32 until the spool coupling system 70 reaches the disengagement condition, and the spool coupling system 70 can be deactivated to prevent reengagement of the spool coupling system 70 above the spool coupling activation condition.

In some embodiments, the mode of operation of the gas turbine engine is a sub-idle mode that activates, engages, disengages, and deactivates the spool coupling system below an idle level of operation of the gas turbine engine during flight. Further, the mode of operation of the gas turbine engine 20 can be a low spool power-assisted idle that results in the high speed spool 32 at idle when the spool coupling system 70 is engaged. The spool coupling system 70 can include a variable transmission system with multiple gear ratios and multiple levels of spool power transfer and engagement speeds.

While the above description has described the flow process of FIG. 7 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a gas turbine engine comprising a low speed spool and a high speed spool;
   a spool coupling system comprising an electro-mechanical actuator and a clutch configured to mechanically link the low speed spool and the high speed spool; and
   a controller operable to:
      determine a mode of operation of the gas turbine engine;
      monitor for a spool coupling activation condition associated with the mode of operation;
      activate the electro-mechanical actuator of the spool coupling system based on the controller detecting the spool coupling activation condition, wherein engagement of the clutch and power transfer between the low speed spool and the high speed spool occurs based on activation of the electro-mechanical actuator of the spool coupling system and reaching an engagement condition of the clutch of the spool coupling system; and deactivate the electro-mechanical actuator of the spool coupling system after disengagement of the clutch and the spool coupling activation condition no longer being detected.

2. The system of claim 1, wherein disengagement of the spool coupling system occurs based on the gas turbine engine reaching a disengagement condition.

3. The system of claim 1, wherein determining the mode of operation of the gas turbine engine includes distinguishing between ground-based operation and flight operation.

4. The system of claim 1, wherein monitoring for the spool coupling activation condition comprises detecting a reduction in speed of the low speed spool below an idle condition prior to a windmill condition while the mode of operation is an in-flight mode.

5. The system of claim 1, wherein the engagement condition of the spool coupling system comprises a gear ratio level of the spool coupling system aligning with a ratio of high speed spool speed to low speed spool speed.

6. The system of claim 5, wherein a stabilization condition is reached after engagement of the spool coupling system resulting in fan windmill power being transferred to the high speed spool, and wherein the low speed spool provides power to the high speed spool until the spool coupling system reaches a disengagement condition.

7. The system of claim 1, wherein the mode of operation of the gas turbine engine is a sub-idle mode that activates, engages, disengages, and deactivates the spool coupling system below an idle level of operation of the gas turbine engine during flight.

8. The system of claim 1, wherein the mode of operation of the gas turbine engine is a low spool power-assisted idle that results in the high speed spool at idle when the spool coupling system is engaged.

9. The system of claim 1, wherein the spool coupling system comprises a variable transmission system with multiple gear ratios and multiple levels of spool power transfer and engagement speeds.

10. A method comprising:

determining, by a controller, a mode of operation of a gas turbine engine, the gas turbine engine comprising a low speed spool and a high speed spool;

monitoring, by the controller, for a spool coupling activation condition associated with the mode of operation;

activating an electro-mechanical actuator of a spool coupling system based on the controller detecting the spool coupling activation condition, wherein engagement of a clutch of the spool coupling system and power transfer between the low speed spool and the high speed spool occurs based on activation of the electro-mechanical actuator of the spool coupling system and reaching an engagement condition of the clutch of the spool coupling system, wherein the spool coupling system is configured to mechanically link the low speed spool and the high speed spool when the clutch is engaged; and deactivating the electro-mechanical actuator of the spool coupling system after disengagement of the clutch and the spool coupling activation condition no longer being detected.

11. The method of claim 10, wherein disengagement of the spool coupling system occurs based on the gas turbine engine reaching a disengagement condition.

12. The method of claim 10, wherein determining the mode of operation of the gas turbine engine includes distinguishing between ground-based operation and flight operation.

13. The method of claim 10, wherein monitoring for the spool coupling activation condition comprises detecting a reduction in speed of the low speed spool below an idle condition prior to a windmill condition while the mode of operation is an in-flight mode.

14. The method of claim 10, wherein the engagement condition of the spool coupling system comprises a gear ratio level of the spool coupling system aligning with a ratio of high speed spool speed to low speed spool speed.

15. The method of claim 14, wherein a stabilization condition is reached after engagement of the spool coupling system resulting in fan windmill power being transferred to the high speed spool, and wherein the low speed spool provides power to the high speed spool until the spool coupling system reaches a disengagement condition.

16. The method of claim 10, wherein the mode of operation of the gas turbine engine is a sub-idle mode that activates, engages, disengages, and deactivates the spool coupling system below an idle level of operation of the gas turbine engine during flight.

17. The method of claim 10, wherein the mode of operation of the gas turbine engine is a low spool power-assisted idle that results in the high speed spool at idle when the spool coupling system is engaged.

18. The method of claim 10, wherein the spool coupling system comprises a variable transmission system with multiple gear ratios and multiple levels of spool power transfer and engagement speeds.

* * * * *